March 1, 1932.  C. W. VOGT ET AL  1,847,149
PROCESSING APPARATUS
Filed June 28, 1929
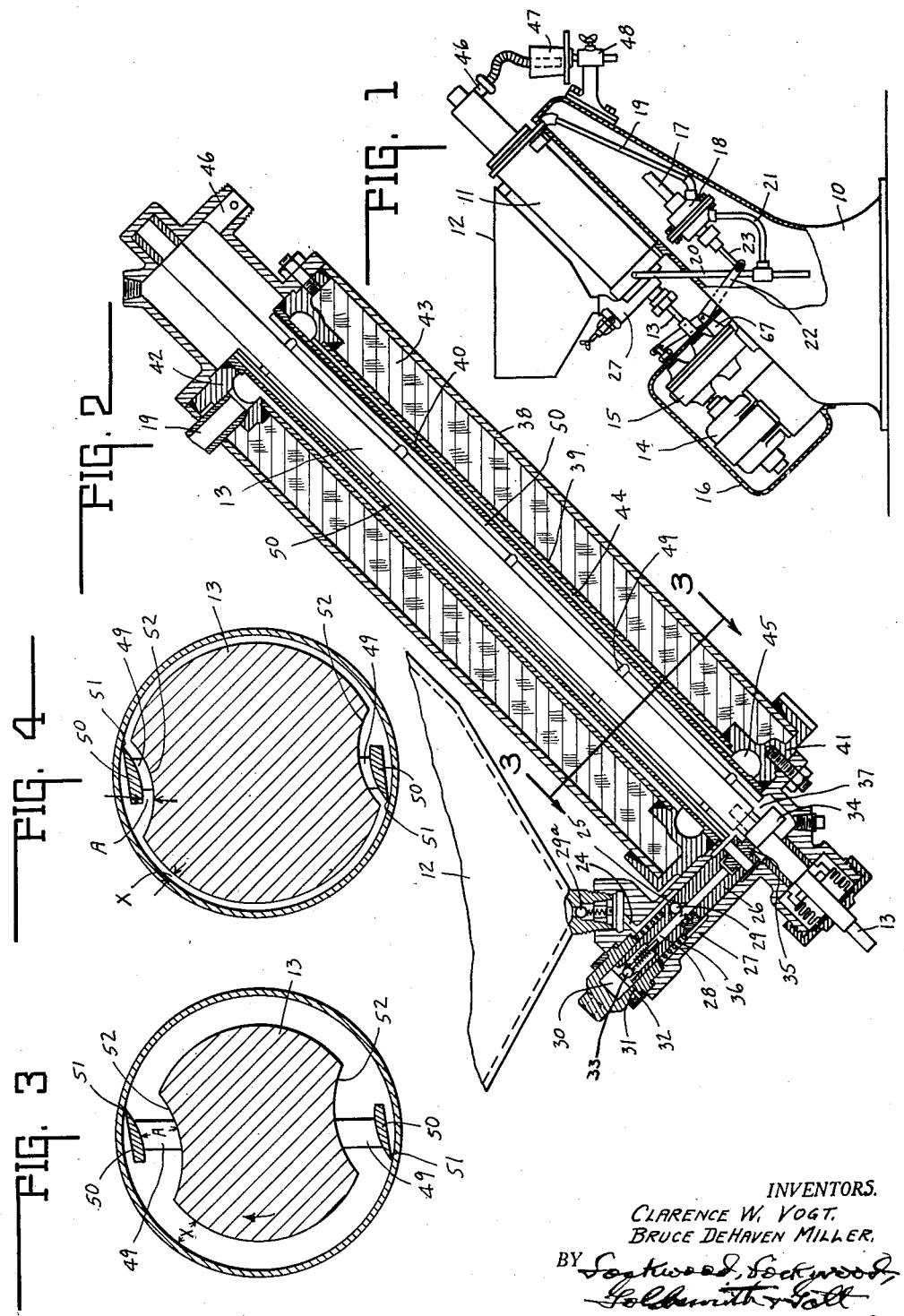
INVENTORS.
CLARENCE W. VOGT,
BRUCE DeHAVEN MILLER.
BY
ATTORNEYS.

Patented Mar. 1, 1932

1,847,149

UNITED STATES PATENT OFFICE

CLARENCE W. VOGT AND BRUCE D. MILLER, OF LOUISVILLE, KENTUCKY, ASSIGNORS TO VOGT INSTANT FREEZERS, INC., A CORPORATION OF KENTUCKY

PROCESSING APPARATUS

Application filed June 28, 1929. Serial No. 374,594.

This invention relates to machines for continuously processing material, particularly to a novel form of scraper or cutter for continuously removing a film of material from the operating surface of such a machine.

In the processing of ice cream, lard, lard substitutes or other materials by heat transfer in a cylindrical processing chamber, it has been found that the best heat transfer efficiency and the greatest uniformity of product can be secured by increasing as much as possible the "surface-volume ratio" or the ratio of the heat transfer surface to the volume of the space open for material passage. This is accomplished by increasing the size of the cutter shaft for a given diameter of processing cylinder, thus cutting down the space open for material flow between the cutter shaft and the heat transfer surface. Heretofore the presence of cutter blades in this space has been a limiting factor in the increase of the surface-volume ratio. If the material flow space is reduced to a point where the cutter blade occupies an appreciable percentage of the space, the material tends to build up in front of the blade instead of passing between the blade and the cutter shaft. In the case of materials, such as ice cream, which are congealed by cooling, this building up process results in a restriction of the flow of material through the processing chamber which may even cause a freeze-up of the machine. In the case of materials, such as ice cream and lard, where air, hydrogen or other fluid is to be whipped into the material, the building up process results in a non-uniform incorporation of the fluid with the remainder of the material, this in turn necessitating a final whipping in an auxiliary whipping chamber. In some materials the restriction of flow results in separation of the material into its constituent ingredients instead of a thorough and uniform mixing.

The principal object of the invention is to provide a cutter and cutter shaft construction which will allow free passage of the material even though the surface-volume ratio is increased much more than has heretofore been possible.

The principal features of the invention reside in the shaping of the cutter blade for cutting the film of material from the heat transfer surface and the shaping of both cutter blade and cutter shaft to permit free flow of material therebetween.

The following description is limited to a machine for congealing ice cream or lard by cooling but it is understood that the invention is not to be limited by such description since it may be used as well in apparatus for processing materials to be congealed by heating or in any type of processing where it is important to use a high surface-volume ratio and to remove a film of material from the processing surface. The invention is also capable of use where no heat transfer is employed, as for example, in the crystallization of chemicals from a solution where such crystallization takes place upon the surface of the processing chamber, or in processes where the physical or chemical condition of a material is changed by contact with a catalytic surface.

The full nature of the invention will be understood from the accompanying drawings and the following specifications and claims.

In the drawings Fig. 1 is an elevational view of a continuous ice cream freezer in which the invention may be used. Fig. 2 is an enlarged cross sectional view taken on the center line of the processing chamber of Fig. 1. Fig. 3 is a cross sectional view of the processing chamber taken on line 3—3 of Fig. 2 and shows approximately the proportion of parts for use in the manufacture of ice cream containing nuts, fruit particles or other solids. Fig. 4 is a similar view to Fig. 3 showing the approximate proportion of parts for the processing of lard and similar materials.

In Fig. 1 a framework 10 supports a processing chamber 11 having a material hopper 12 and a cutter shaft 13. The cutter shaft 13 is driven by an electric motor 14 through a reduction gear set 15. The motor and gearing are covered by a shield 16. Brine or other refrigerant is supplied to the processing chamber 11 by means of an intake pipe 17, a brine bypass valve 18 and a pipe line 19.

The refrigerant is returned from the processing chamber through pipe line 20. A bypass 21 connects the bypass valve 18 and the brine return line 20. The flow of brine is controlled by a torque responsive mechanism contained within the gear housing 15 and by means of lever 22 and stem 23 as described in Patent No. 1,783,864 granted to Clarence W. Vogt, December 2, 1930, on co-pending application Serial No. 316,567, filed November 1, 1928.

The storage hopper 12 contains the material to be processed and communicates by a passageway 24 and a port 25 with a chamber 28 situated within a piston 26. The piston 26 is adapted to reciprocate within a housing 27 which forms a part of the lower end of the processing chamber. Return flow of material through port 25 and passage 24 is prevented by spring-actuated ball valves 29 and 29$^a$. Adjacent the upper end of the piston is a chamber 30 communicating through a port 31 with the atmosphere or any other suitable fluid source. A spring-actuated ball valve 33 controls the passage of such fluid from the chamber 30 to the chamber 28. Carried on the shaft 13 is a cam 34 engaging a roller 35 carried on the lower end of the piston 26. A spring 36 abuts against a shoulder on the piston 26 and serves to maintain the roller 35 normally in contact with the cam 34. The chamber 28 communicates with the lower end 37 of the processing chamber. Thus the rotation of shaft 13 tends to reciprocate the piston 26 by means of the cam 34, roller 35 and spring 36. The reciprocation of the piston tends to pump the material to be processed and the air or other fluid to be incorporated therewith into the lower end of the processing chamber.

The processing chamber consists of an outer shell 38 and two inner shells 39 and 40 suitably connected by cast heads 41 and 42. Between the outer shell 38 and the shell 39 is a packing 43 of suitable insulating material. Between the shell 39 and shell 40 is a refrigerant space 44 connecting at one end with the refrigerant intake 19 and at the opposite end with a chamber 45 connecting in turn with the refrigerant outlet 20. At the upper end of the processing chamber is an outlet 46 through which the finished material is discharged to a suitable container 47 carried upon a bracket 48 upon the frame 10.

The shaft 13 extends centrally within the inner shell 40 from one end of the processing chamber to the other. Within the chamber the shaft is of proper diameter to give the desired surface-volume ratio. Spaced at suitable intervals along the shaft 13 are members 49 carrying cutter blades 50. The cutter blades 50 have a sharp edge 51 which serves to cut away any film of congealed material which tends to build up on the heat transfer surface. Beneath each of the cutter blades 50 is formed a hollowed-out portion 52 in the shaft 13. The inner surface of the cutter blade is curved as shown and the surface of the hollowed-out portion 52 is made roughly parallel with the said curvature of the blade.

The distance indicated by the dimension A between the inner surface of the blade and the portion 52 of the shaft is made sufficient to allow free passage of material therethrough. It has been found that this distance should be at least as great as the distance X beween the normal diameter of the shaft and the inner surface of the shell 40. However, in processing ice cream best results are secured when dimension A equals approximately 1¼ to 1½ times dimension X.

The provision of the passageway beneath the cutter blade eliminates all tendency toward building up of material ahead of the blades and thereby prevents the stoppage of material flow which normally results from the use of a completely cylindrical shaft and a high surface-volume ratio.

Heretofore, using a cylindrical cutter shaft, a surface-volume ratio of approximately three square inches to one cubic inch has been the maximum possible to give satisfactory results. The proportions illustrated in Fig. 3 for use with ice cream containing nuts and other solids give a surface-volume ratio of approximately four square inches to one cubic inch. The proportions shown in Fig. 4 give a surface-volume ratio of sixteen square inches to one cubic inch and may be used for processing lard or other similar material. Both proportions have been successively used in the processing of these and other materials without the necessity of an auxiliary whipping chamber to complete the incorporation of air, hydrogen or other fluid.

In prior Patent No. 1,783,864, above referred to, there has been disclosed an apparatus having a surface to volume relationship not substantially less than 1 to 1, the inch being the unit of measurement. Although this relationship, in the present invention, is preferably greater than 3 to 1, it will be evident that such relationship may vary above and below 3 to 1, depending upon the diameter of the chamber, the character and volume of the material being processed, the speed of rotation of the shaft, the speed of advancement of the material, and other factors.

The invention claimed is:

1. A processing apparatus including a heat transfer surface, a member disposed with respect to said surface so as to form therewith a processing chamber, and a member adapted to remove material from said heat transfer surface, said members being so formed and disposed with respect to each other as to provide at all times at least as much clearance for the passage of material therebetween as between said first-mentioned member and said heat transfer surface.

2. In a processing apparatus having a heat transfer surface and a member adapted to remove material therefrom, a shaft for supporting said member spaced from said surface to provide a passage for material therebetween, and having a portion formed to provide at all times a distance between said member and said shaft at least as great as the distance between said shaft and said heat transfer surface at their closest approach.

3. A processing apparatus including a heat transfer surface, a shaft spaced from said surface to provide a passage for material therebetween, and a member carried by said shaft and adapted to remove material from said heat transfer surface, said member having a convex surface adjacent said shaft, and said shaft having a concave surface approximately parallel to said convex surface and spaced therefrom at least as far as the distance between said heat transfer surface and said shaft at their closest approach.

4. A processing apparatus having a surface volume ratio greater than three square inches to one cubic inch, and including a heat transfer surface, a shaft spaced therefrom to provide a passage for material therebetween, and a member carried by said shaft and adapted to remove material from said heat transfer surface, the distance between the inner surface of said member and said shaft being at all times at least as great as the distance between said heat transfer surface and said shaft at their closest approach.

5. In a processing apparatus having a heat transfer surface and a member adapted to remove material from said surface, a support for said member spaced from said heat transfer surface to provide a passage for material therebetween and having a portion at all times adjacent to said member spaced farther from said heat transfer surface than other portions of said support to prevent undue restriction to the passage of material between said member and said support.

6. A processing apparatus including a heat transfer surface, a member disposed with respect to said surface so as to form therewith a processing chamber having a ratio of heat transfer surface to volume of at least three square inches to one cubic inch, and a member adapted to remove material from said heat transfer surface, said members being so formed and disposed with respect to each other as to provide at all times at least as much clearance for the passage of material therebetween as between said first-mentioned member and said heat transfer surface.

7. A processing apparatus including an operating surface, a member disposed with respect to said surface so as to form therewith a processing chamber, and a member adapted to remove material from said operating surface, said members being so formed and disposed with respect to each other as to provide at all times at least as much clearance for the passage of material therebetween as between said first-mentioned member and said operating surface.

8. In a processing apparatus having an operating surface and a member adapted to remove material from said operating surface, a shaft for supporting said member spaced from said operating surface to provide a passage for material therebetween, and having a portion thereof formed to provide a distance between said member and said shaft at least as great as the distance between said shaft and said operating surface at their closest approach.

9. A processing apparatus including an operating surface, a shaft spaced therefrom to provide a passage for material therebetween and a member carried by said shaft and adapted to remove material from said operating surface, said member having a convex surface adjacent said shaft, and said shaft having a concave surface approximately parallel to said convex surface and spaced therefrom at least as far as the distance between said operating surface and said shaft at their closest approach.

10. A processing apparatus having a surface volume ratio greater than three square inches to one cubic inch and including an operating surface, a shaft spaced therefrom to provide a passage for material therebetween, and a member carried by said shaft and adapted to remove material from said operating surface, the distance between the inner surface of said member and said shaft being at all times at least as great as the distance between said operating surface and said shaft at their closest approach.

11. In a processing apparatus having an operating surface and a member adapted to remove material from said surface, a support for said member spaced from said surface to provide a passage for material therebetween, and having a portion at all times adjacent to said member spaced farther from said operating surface than other portions of said support to prevent undue restriction to the passage of materials between said member and said support.

12. A processing apparatus including an operating surface, a member disposed with respect to said surface so as to form therewith a processing chamber having a ratio of operating surface to volume of at least three square inches to one cubic inch, and a member adapted to remove material from said operating surface, said members being so formed and disposed with respect to each other as to provide at all times at least as much clearance for the passage of material therebetween as between said first-mentioned member and said operating surface.

13. A processing apparatus including a heat transfer surface, a member adapted to remove material from said surface, and a support therefor spaced from said surface to provide a passage for material therebetween, the clearance between the under surface of said member and said support being at all times at least as great as the clearance between said heat transfer surface and said support.

14. A processing apparatus including a cylindrical operating surface, a member substantially centrally disposed therein, relatively rotatable with respect thereto and adapted to form therewith a processing chamber, and a member adapted to remove material from said operating surface, said members being so formed and disposed with respect to each other as to provide at all times at least as much clearance for the passage of material therebetween as between said first-mentioned member and said operating surface.

15. A processing apparatus including a cylindrical operating surface, a member substantially centrally disposed therein, relatively rotatable with respect thereto and adapted to form therewith a processing chamber having a ratio of operating surface to volume of at least three square inches to one cubic inch, and a member adapted to remove material from said operating surface, said members having fixed angular positions with respect to each other and being so formed as to provide at all times at least as much clearance for the passage of material therebetween as between said first-mentioned member and said operating surface.

In witness whereof, we have hereunto affixed our signatures.

CLARENCE W. VOGT.
BRUCE D. MILLER.